(12) United States Patent  
Kamiya (10) Patent No.: US 6,443,343 B2  
(45) Date of Patent: Sep. 3, 2002

(54) HOLDER FOR A PORTABLE APPARATUS

(75) Inventor: Shinichi Kamiya, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/886,798

(22) Filed: Jun. 21, 2001

Related U.S. Application Data (63) Continuation of application No. 09/349,351, filed on Jul. 7, 1999, now Pat. No. 6,311,881.

(30) Foreign Application Priority Data

Jul. 7, 1998 (JP) .......................................... 10-192059

(51) Int. Cl.⁷ .................................................. A45F 5/00
(52) U.S. Cl. ...................... 224/269; 224/272; 224/666; 224/678; 224/930; 24/3.9; 24/3.12
(58) Field of Search ................................ 224/269, 271, 224/272, 930, 194, 195, 663, 665, 666, 667, 668, 669, 670, 671, 672, 673, 676, 678, 679; 24/3.12, 3.1, 3.9, 3.11

(56) References Cited

U.S. PATENT DOCUMENTS

| 4,083,481 | A | * | 4/1978 | Selinko ...................... 224/670 |
| 4,971,236 | A | * | 11/1990 | Grummet ................. 224/676 X |
| 5,081,709 | A | | 1/1992 | Benyo et al. |
| 5,261,122 | A | * | 11/1993 | Otsuki et al. ............ 224/670 X |
| 5,472,317 | A | * | 12/1995 | Field et al. .............. 224/670 X |
| 5,584,423 | A | * | 12/1996 | Wang ..................... 224/678 X |
| 5,664,292 | A | | 9/1997 | Chen |
| 5,748,454 | A | | 5/1998 | Nichols et al. |
| 5,791,019 | A | * | 8/1998 | Jeong ...................... 224/670 X |
| 5,829,102 | A | * | 11/1998 | Conti .......................... 24/3.12 |
| 5,906,031 | A | * | 5/1999 | Jensen ........................ 24/3.12 |
| 5,996,184 | A | * | 12/1999 | Mah et al. .................. 24/3.12 |

FOREIGN PATENT DOCUMENTS

| EP | 298-759 A2 | 1/1989 |
| GB | 2 247 494 A | 3/1992 |
| JP | 5-122127 | 5/1993 |
| JP | 6-9244 | 2/1994 |
| JP | 7-78607 | 3/1995 |
| JP | 5-65131 | 10/1997 |

* cited by examiner

Primary Examiner—Stephen K. Cronin  
(74) Attorney, Agent, or Firm—Scully, Scott, Murphy & Presser (57) ABSTRACT

A holder for a pager, handy phone or similar portable apparatus includes a body for removably receiving the apparatus and a clip removably mounted to the body. A guide is formed on one surface of the body and includes a pair of parallel rails. An engaging portion is included in the clip and includes a pair of ridges slidingly engageable with the rails. A locking device is provided on the guide and engaging portion for selectively locking or unlocking them to or from each other. The locking device is implemented by a recess and a lug respectively positioned between one of the rails and ridges and between the other of the rails and ridges. A slit surrounds the lug while the lug is connected to one side of the wall of the slit and elastically deformable toward and away from the recess. The recess and lug mate with each other when the engaging portion is slid into the guide.

10 Claims, 10 Drawing Sheets

HOLDER FOR A PORTABLE APPARATUS

CROSS REFERENCE TO RELATED APPLICATIONS

This application is a continuation application of U.S. patent application Ser. No. 09/349,351 filed Jul. 7, 1999 now U.S. Pat. No. 6,311,881.

BACKGROUND OF THE INVENTION

The present invention relates to a holder for a pager, handy phone or similar portable electronic apparatus and more particularly to a holder capable of being put on the user's trousers or belt.

A miniature portable electronic apparatus, e.g., a pager or a handy phone is expected to be used while being carried by the user. Usually, therefore, this kind of portable apparatus is removably received in a holder including a clip. The user of the apparatus passes the user's belt through the clip so as to carry the apparatus received in the holder. This enhances the portability of the apparatus without degrading the manipulability of the apparatus.

Japanese Patent Laid-Open Publication No. 5-122127, for example, discloses a holder for the above application. A problem with the holder taught in this document is that it needs a number of structural elements including a body for receiving a portable apparatus, a clip for passing a belt, a pin for connecting the body and clip, a torsion coil spring, and stop members for stopping the pin. Another problem is that to assemble the holder, it is necessary to align hinges formed on the holder and clip against the action of the torsion spring, pass the pin through the hinges, and then affix the stop members to the pin. Such a procedure is difficult to perform and increases the production cost of the holder.

Japanese Utility Model Laid-Open Publication No. 6-9244 proposes a holder having a case or body and a clip implemented as a single molding for reducing the number of pats and simplifying assembly work. This, however, brings about other problems, as follows. The molding including the body and clip is not obtainable without complicating the structure of a mold and is apt to render the production of the holder more sophisticated. Moreover, when either the body or the clip is broken, the holder must be bodily discarded because the body and clip are molded integrally with each other. Discarding the body or the clip still usable is undesirable from the user's expenses standpoint as well as from the resource standpoint.

Technologies relating to the present invention are also disclosed in, e.g., Japanese Patent Laid-Open Publication Nos. 7-8607 and 5-65131.

SUMMARY OF THE INVENTION

It is therefore an object of the present invention to provide a holder for a portable apparatus including a clip removably mounted to a body so as to enhance easy and efficient maintenance.

It is another object of the present invention to provide a holder for a portable apparatus needing a minimum number of parts and allowing a body and a clip to be firmly assembled in a simple structure.

It is a further object of the present invention to provide a holder for a portable apparatus capable of being assembled easily and rapidly and promoting easy and rapid replacement of a clip.

A holder for a portable apparatus of the present invention includes a body for removably receiving the apparatus and a clip removably mounted to the body. A guide is formed on one surface of the body and includes a pair of parallel rails. An engaging portion is included in the clip and includes a pair of ridges slidingly engageable with the rails. A locking device is provided on the guide and engaging portion for selectively locking or unlocking them to or from each other. The locking device is implemented by a recess and a lug respectively positioned between one of the rails and ridges and between the other of the rails and ridges. A slit surrounds the lug while the lug is connected to one side of the wall of the slit and elastically deformable toward and away from the recess. The recess and lug mate with each other when the engaging portion is slid into the guide.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, brief reference will be made to a conventional holder for a portable apparatus, shown in FIGS. 1 and 2. As shown, the holder is generally made up of a body 110 and a clip 120 hinged to the rear of the body 110. A portable apparatus 101 (indicated by a dash-and-dots line in FIG. 2) is removably received in the body 110. The user of the portable apparatus may pass the user's belt through the clip 120 for carrying the apparatus with the user.

Figure 1:
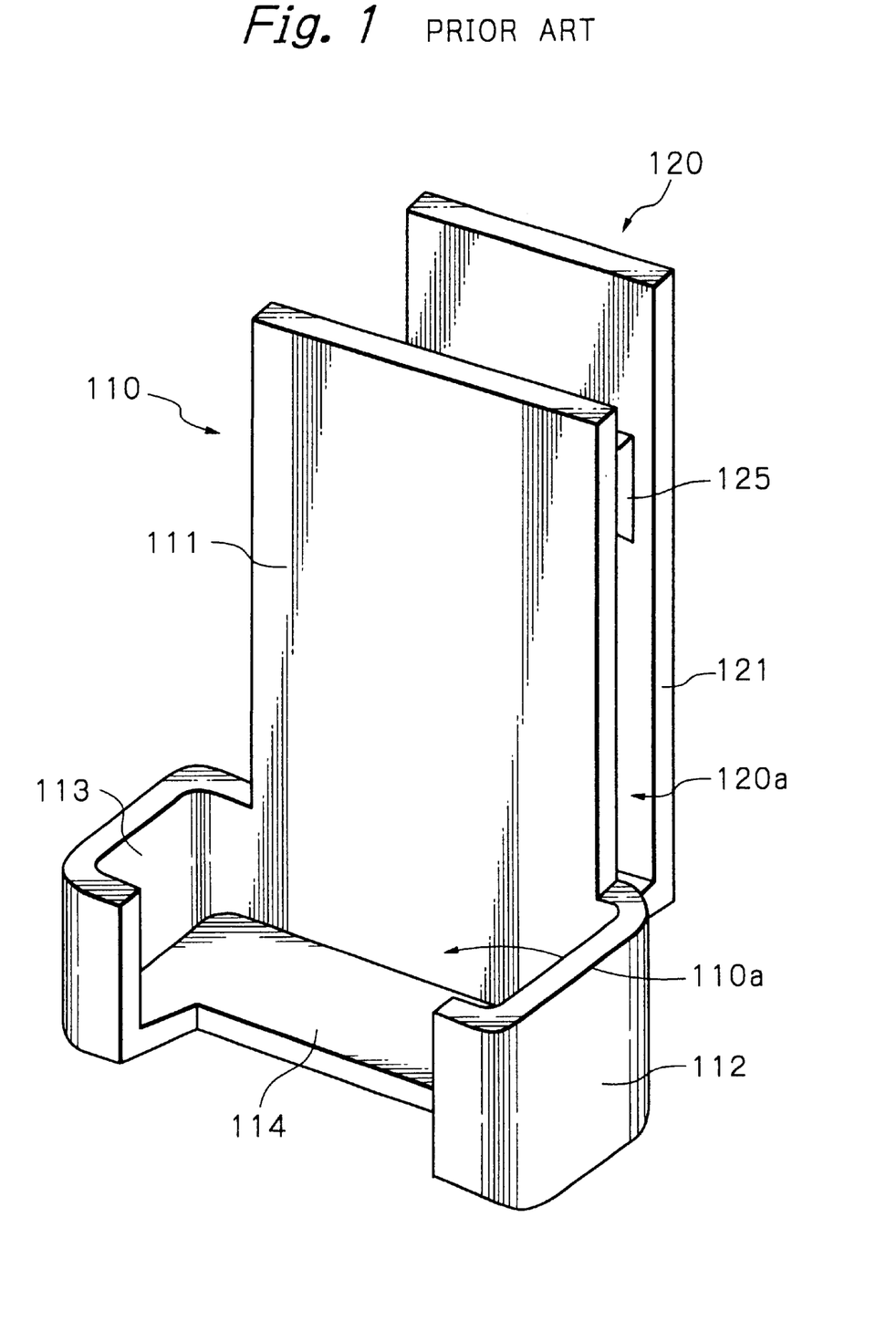
FIG. 1 is a perspective front view showing a conventional holder.

As shown in FIG. 1, the body 110 has a rectangular, thin rear wall 111, a pair of side walls 112 and 113 protruding forward from the lower portions of opposite sides of the rear wall 111, and a bottom wall 114 connecting the bottoms of the three walls 111, 112 and 113. The rear wall 111, sidewalls 112 and 113 and bottom wail 114 form a pocket 110a for receiving the portable apparatus 101. As shown in FIG. 2, a pair of hinges 115 protrude from the rear upper portion of the rear wall 111.

Figure 2:
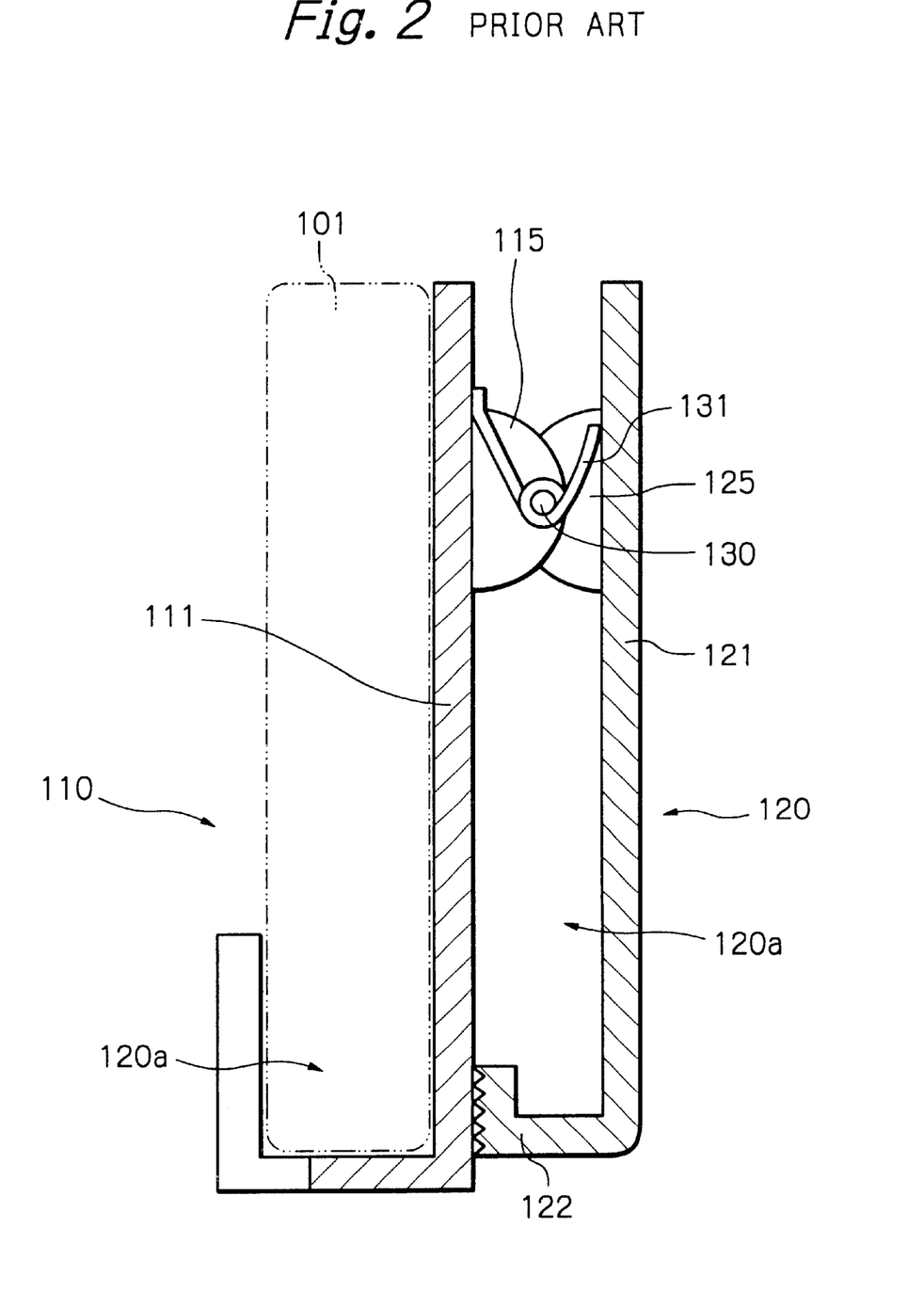
FIG. 2 is a vertical sectional side elevation of the holder shown in FIG. 1.

As shown in FIG. 2, the clip 120 mounted on the rear of the body 110 is implemented by a thin plate 121 having its lower end bent toward the body 110 in the form of a letter L, as viewed in a vertical sectional view. The bent end of the plate 121 constitutes an anti-slip portion 122. A pair of hinges 125 protrude from the surface of the plate 121 facing the rear wall of the body 110 toward the hinges 115. A pin 130 is passed through the hinges 115 and 125, so that the hinges 115 and 125 can rotate relative to each other. Stop members, not shown, are fitted on the pin 130 so as to prevent it from slipping out of the hinges 115 and 125.

The anti-slip portion 122 of the plate 121 abuts against the rear wall 111 of the body 110. This, coupled with the hinges 115 and 125 connected together by the pin 130, positions the plate 121 and rear plate 111 parallel to each other. In this condition, the body 110 and clip 120 form a space 120a for receiving the user's belt.

A torsion coil spring 131 is wound round the pin 130 and anchored at one end to the hinge 115 and at the other end to the hinge 125. The spring 131 constantly biases the plate 121 such that the anti-slip portion 122 remains in contact with the rear wall 111 of the body 110.

When the user presses the end portion of the plate 121 adjoining the coil spring 131 toward the rear wall 111, the hinges 115 and 125 rotate about the pin 130 against the action of the spring 131. As a result, the clip 120 is moved, or opened, away from the rear wall 111. In this condition, the user passes the belt through the space. 120 of the clip 120 and then releases the clip 120. Consequently, the anti-slip portion 122 of the plate 121 is brought into contact with the rear wall 111 due to the action of the spring 131, preventing the body 110 from dropping from the belt. Thereafter, the user puts the portable apparatus 101 in the pocket 110a of the body 110.

The above conventional holder has some problems left unsolved, as discussed earlier.

Reference will be made to FIGS. 1–6 for describing a holder for a portable apparatus embodying the present invention. As shown, the holder is made up of a body 10 and a clip 20. The body 10 is capable of removably receiving a pager or similar portable apparatus 1. The clip 20 is removably mounted to the rear of the body 10.

In the illustrative embodiment, the body 10 and clip 20 each are implemented as a molding of resin that is lightweight, durable and easy to shape. Of course, the body 10 and clip 20 may each be formed of any other suitable material by any desired method so long as it allows the holder to hold the portable apparatus 1.

Figure 3:
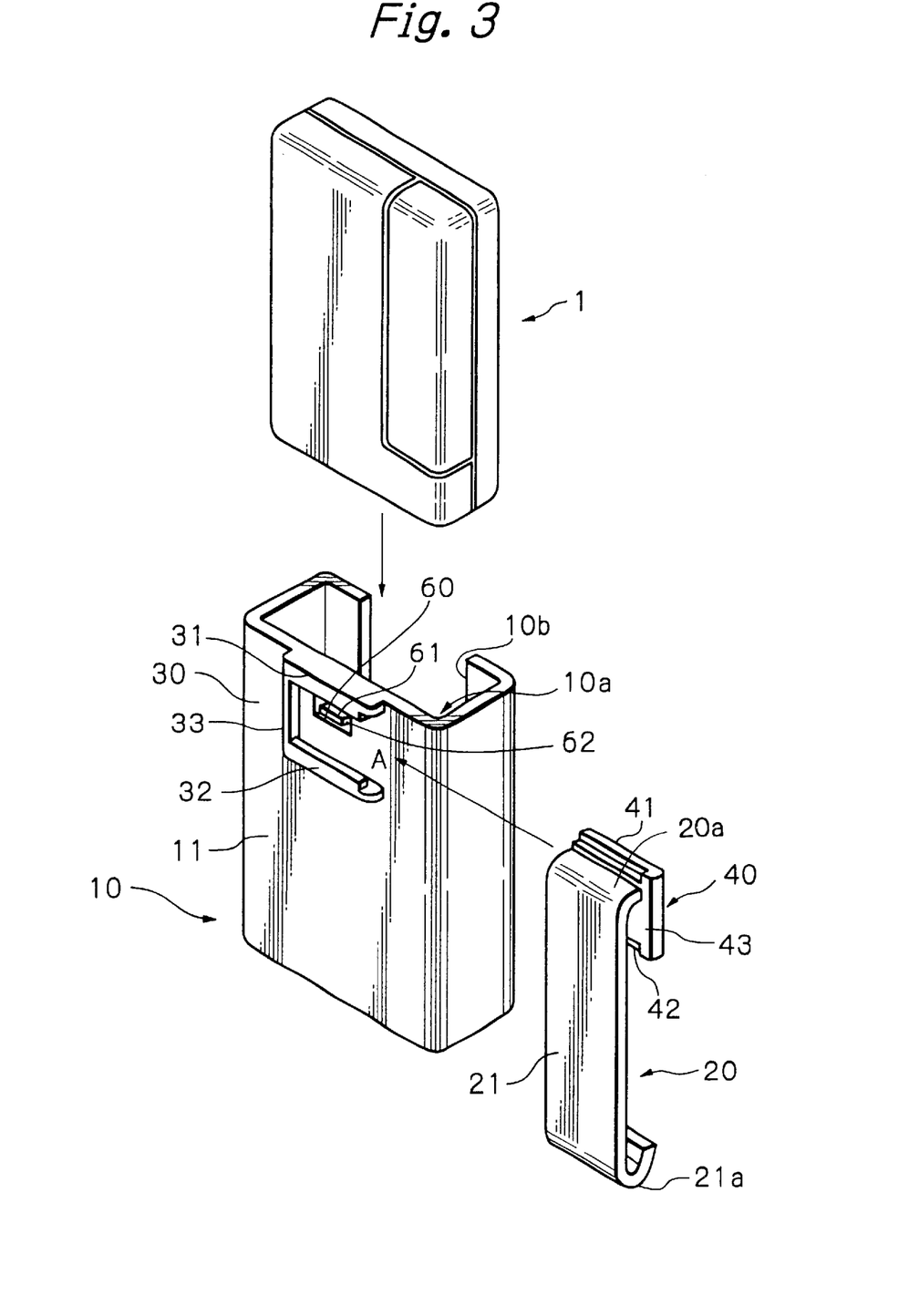
FIG. 3 is an exploded perspective rear view showing a holder embodying the present invention.
Figure 4:
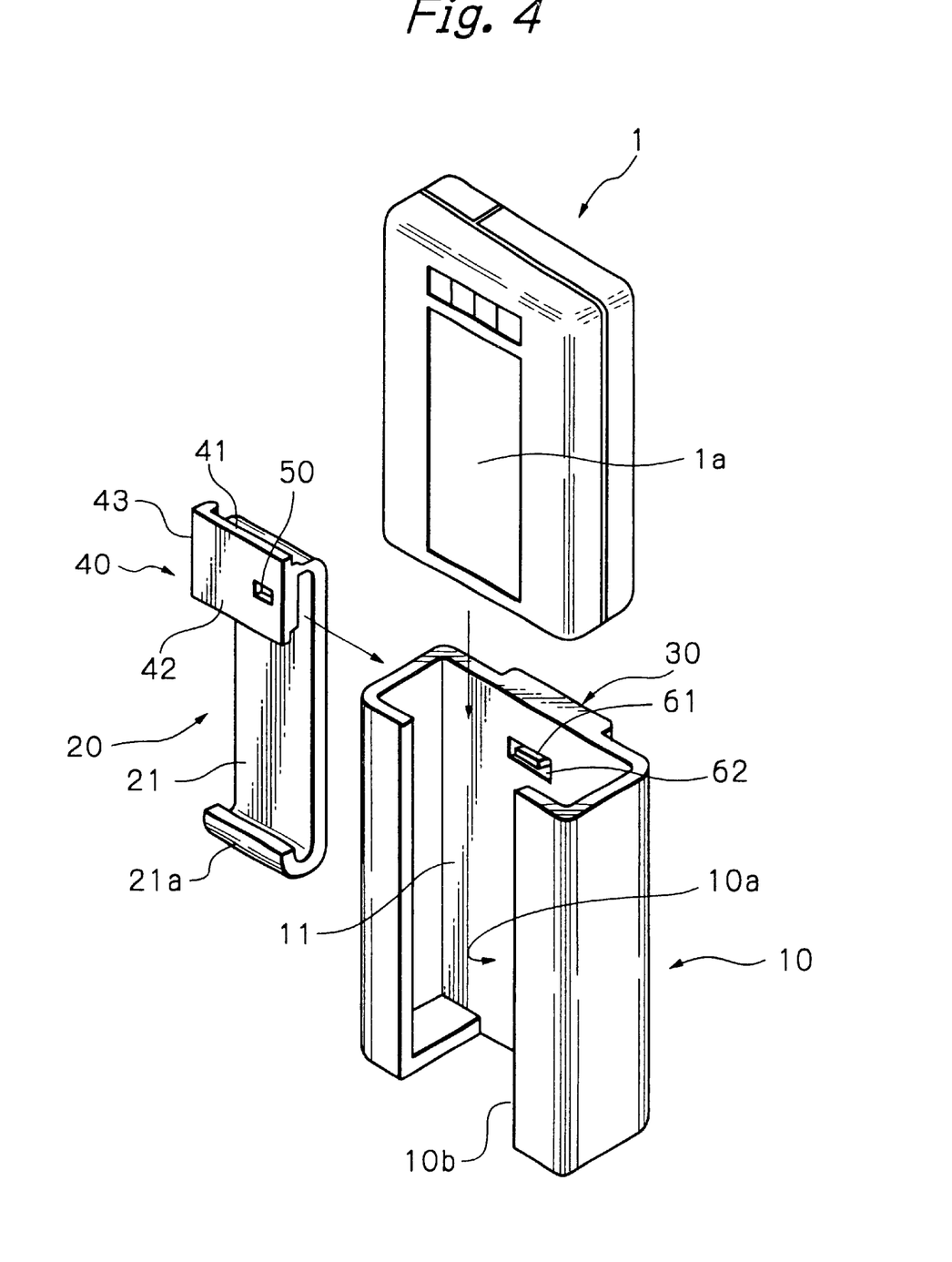
FIG. 4 is an exploded perspective front view of the holder shown in FIG. 3.

As shown in FIGS. 3 and 4, the body 10 is implemented by a thin plate in the form of a bottomed, top-open rectangular case and has a pocket 10a for receiving the apparatus 1.

In the illustrative embodiment, an opening 10b is formed in the front and bottom of the body 10 and communicated to the top opening of the body 10 at its center portion. The opening 10b not only facilitates the movement of the apparatus 1 into and out of the pocket 10a, but also allows the user to easily see a display 1a and operate buttons arranged on the apparatus 1 therethrough. In addition, the opening 10b serves to radiate heat generated in the apparatus 10 to the outside. Moreover, the opening 10b positioned at the front of the body 10 facilitates the removal of the clip 20, as will be described specifically later.

A guide 30 for guiding the clip 20 is formed on a rear wall 11 included in the body 10. Specifically, the guide 30 is positioned on the upper end of the rear wall 11 and includes a pair of parallel rails 31 and 32 extending in the lateral direction of the body 10. More specifically, the guide 30 is a substantially U-shaped frame portion open at its one end in the lateral direction of the body 10. In the illustrative embodiment, the frame portion protrudes from the rear wall 11 so as to form the guide 30. The top and bottom of the U-shaped guide 30 constitute the rails 31 and 32, respectively.

The clip 20 includes an engaging portion 40, which will be described specifically later, engageable with the rails 31 and 32 and slidable along the rails 31 and 32 in the lateral direction of the holder (arrow A, FIG. 3). The rails 31 and 32 are positioned at substantially the center of the upper end of the rear plate 11. The end of the U-shaped guide 30 opposite to the open end constitutes a stop 33 for stopping the leading end of the engaging portion 40 in the direction in which the portion 40 is slid into the guide 30. A lug 60 protrudes from a position of the rear plate 11 between the rails 31 and 32.

As shown in FIGS. 3 and 4, the clip 20 is implemented by a thin plate having opposite ends bent toward the body 10 in the form of a letter C as viewed in a vertical section. The upper bent end 20a, as viewed in FIGS. 3 and 4, of the clip 20 merges into the engaging portion 40. The plate 21 is positioned with its lengthwise direction coinciding with the direction of height of the holder 10 and then mounted to the body 10.

Because the clip 20 is formed of resin, as stated earlier, the plate 2 is elastically deformable away from the body 10 to an adequate degree when the user's belt is to be passed through the clip 20.

The engaging portion 40 of the clip 20 includes a flat surface parallel to the rear wall 11 of the body 11, as illustrated. The upper and lower edges of the flat surface or engaging portion 40 constitute a pair of ridges 41 and 42 slidable on the rails 31 and 32, respectively. The other or trailing end of the engaging portion 40 in the direction A, FIG. 3, in which the portion 40 is slid into the guide 30 is configured as a stop 43 perpendicular to the ridges 41 and 42. When the engaging portion 40 is slid into the guide 30, the trailing end of the portion 40 abuts against the ends of the rails 31 and 32.

Figure 5:
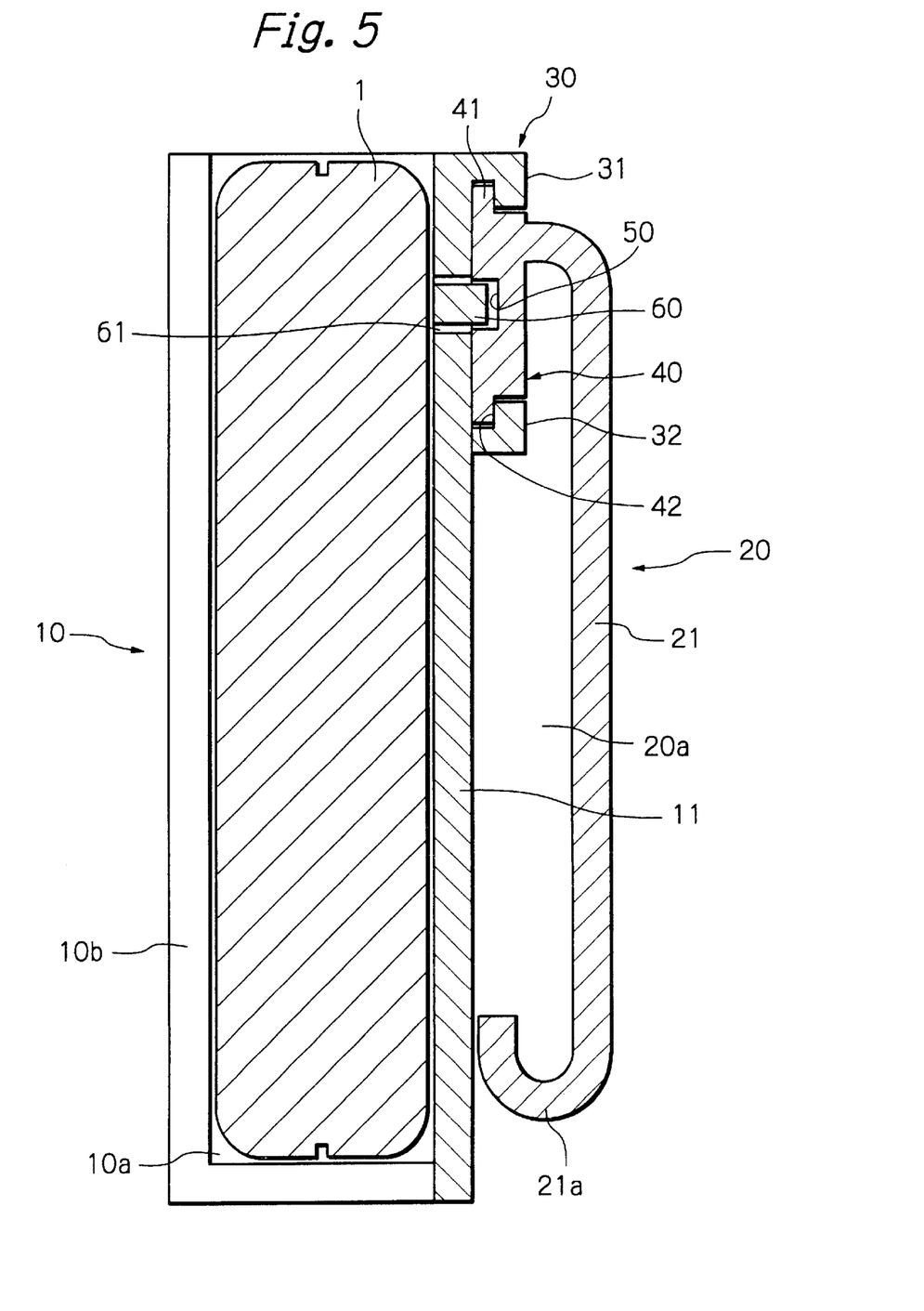
FIGS. 5 and 6 are respectively a vertical and a horizontal sectional side elevation showing the illustrative embodiment with a portable apparatus.

The lower end of the plate 21 opposite to the upper end or engaging portion 40 is implemented as a curved end 21a. As shown in FIG. 5, the bent end 21a has such a height that a small gap exists between the bent end 21a and the rear wall 11 when the engaging portion 40 is slid into the guide 30.

Figure 6:
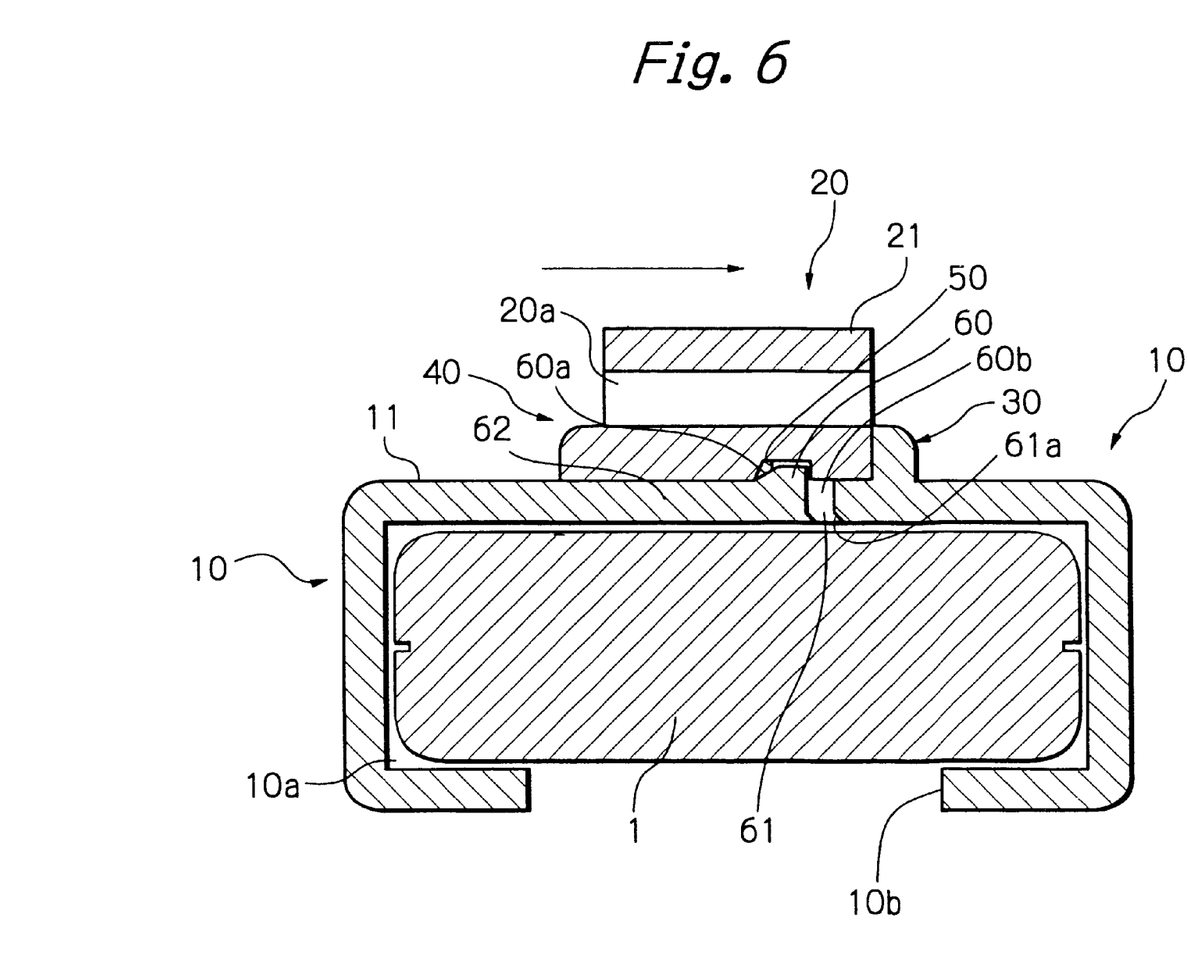

The Illustrative embodiment further includes a locking device arranged on the guide 30 and engaging portion 40. Specifically, as shown in FIGS. 5 and 6, the locking device is constituted by the previously mentioned lug 60 protruding from the guide 30 and a recess 50 formed in the engaging portion 40. When the engaging portion 40 is slide into the guide 30, the recess 50 and lug 60 mate with each other and lock the clip 20 to the body 10.

More specifically, as shown in FIG. 4, the recess 50 is formed in the flat surface of the engaging portion 40 expected to face the rear wall 11 of the body 10. As shown in FIG. 5, the recess 50 is positioned substantially at the intermediate between the upper and lower ridges 41 and 42. The recess 50 is at least deep enough to receive the lug 60 and should preferably be sized slightly greater than the lug 60 such that the walls of the recess 50 do not hit against the lug 60. The recess 50 may be replaced with a hole extending throughout the engaging portion 40, if desired.

The lug 60 elastically protrudes from the rear wall 11 of the body 10 rearward, i.e., toward the recess 50 expected to mate with the lug 60. In the illustrative embodiment, the lug 60 is formed integrally with the rear wall 11 between the rails 31 and 32. More specifically, as shown in FIGS. 3–6, a slit 61 is formed in the rear wall 11 around the lug 60. The lug 61 is connected to the rear wall 11 by an elastic piece 62 at one side of the slit 62 and protrudes from the rear wall 11.

In the illustrative embodiment, the above slit 62 is elongate in the lateral direction of the rear wall 11, i.e., in the direction A, FIG. 3. The lug 61 is connected to one side of the wall of the slit 61 in the lengthwise direction of the slit 61 by the elastic piece 62. The elastic piece 62 therefore supports the lug 60 with a preselected degree of elasticity, so that the lug 60 is elastically movable into and out of the recess 50.

In the illustrative embodiment, the lug 60, slit 61 and elastic piece 62 are formed integrally with the body 10 by use of resin. This implements a simple locking device without resorting to a sophisticated structure or a number of parts. If desired, the lug 60 and elastic piece 62 may be formed independently of the rear wall 11 and then affixed to the wall of the slit 61 so long as the lug 60 can elastically move into and out of the recess 50.

As shown in FIG. 6, the lug 60 includes a surface 60a that faces the engaging portion 40 when the portion is slid into the guide 30. The surface 60a is inclined forward in the direction in which the engaging portion 40 is slid into the guide 30. This inclined surface 60a promotes the smooth engagement of the engaging portion 40 with the guide 30 and allows the lug 60 and recess 50 to easily mate with each other. Consequently, the clip 20 can be easily mounted to the body 10.

As shown in FIG. 6, the end of the lug 60 opposite to the end contiguous with the elastic piece 62 is implemented as an inclined surface 60b inclined toward the recess 50. The part of the wall of the slit 61 facing the above end of the lug 60 is implemented as an inclined surface 61a substantially parallel to the inclined surface 60b.

To release the lug 60 from the recess 50, a screwdriver or similar tool having a sharp tip is inserted into a gap between the above inclined surfaces 60b and 61b from the rear of the lug 60, i.e., the inside of the body 10. After the tip of the tool has been positioned on the inclined surface 60b, the tool is pushed toward the operator so as to deform the elastic piece 62 until the lug 60 has been released from the recess 50. In this manner, the clip 20 with the recess 50 can be easily removed from the body 10 with the lug 60 and replaced with a new clip. The removal of the clip 20 from the body 10 is performed through the front opening 10b of the body 10 after the removal of the portable apparatus 1 from the body 10.

How the clip 20 is mounted to and dismounted from the body 10 will be described specifically hereinafter. To mount the clip 20 to the body 10, the engaging portion 40 of the clip 20 is slid into the guide 30 of the body 10 via the open end of the guide 30. At this instant, the rails 31 and 32 respectively guide the ridges 41 and 42 in the direction A, FIG. 3. Although the lug 60 protruding from the guide 30 abuts against the head end of the engaging portion 40 in the direction A, it is elastically deformable about the elastic piece 62. This, coupled with the inclined surface 60a of the lug 60, allows the engaging portion 40 to smoothly slide into the guide 30.

The engaging portion 40 stops sliding when its leading end abuts against the stop 33 of the guide 30 and when its trailing end or stop 43 abuts against the open end of the guide 30. At the same time, the lug 60 smoothly snaps into the recess 50 because of its elasticity and inclined surface 60a.

FIGS. 5 and 6 show the body and clip 20 in the assembled condition. As shown in FIG. 5, the plate 21 is spaced from the rear wall 11, forming the space 20a mentioned earlier. In this condition, the user's belt is inserted into the space 20a via the gap between the rear wall 11 and the curved lower end 21a of the clip 20. This can be easily done only if the portion of the clip 20 adjoining the above end 2a is pulled away from the body 10.

The belt received in the space 20a is prevented from slipping out because the engaging portion or upper end 40 of the clip 20 is engaged with the guide 30 and because the curved lower end 21a of the clip 20 is curved toward the body 10. After the above procedure, the user may put the portable apparatus 1 in the pocket 10a for carrying the apparatus 1 with the user.

To remove the clip 20 from the body 10, the user first removes the apparatus 1 from the pocket 10a of the body 10 and then inserts a screwdriver or similar tool with a sharp tip via the front opening 10b of the body 10 and the rear of the lug 60 received in the recess 50. After positioning the tip of the tool between the parallel inclined surfaces 60b and 61b, the user pushes the tip toward the user. As a result, the tip of the tool contacts the inclined surface 60b and deforms the elastic piece 62 inward, causing the lug 60 to move out of the recess 50. As a result, the lug 60 and recess 50 are released from each other. In this condition, the user slides the clip 20 away from the body 10 in the direction opposite to the direction A, FIG. 3.

The above embodiment achieves the following various unprecedented advantages.

(1) The clip 20 capable of receiving the user's belt is removably mounted to the body 10 capable of receiving the apparatus body 1. The body 10 or the clip 20 can therefore be freely replaced without degrading easy and efficient maintenance of the holder.

(2) The holder is made up only of the body 10 and clip 20. The holder therefore has only a far smaller number of parts than the conventional holder needing not only a holder body and a clip but also a coil spring, a shaft, stop members, etc.

(3) Only if the engaging portion 40 of the clip 20 is slid into the guide 30 of the body 10, the holder assembly is completed with the recess 50 and lug 60 mating with each other. The body 10 and clip 20 can therefore be firmly assembled in a short period of time by a simple operation.

(4) The lug 60 is resiliently movable into and out of the recess 50. Therefore, the removal of the clip 20 from the body 10 is also easy and rapid. In addition, the clip 20 can be easily replaced without impairing easy maintenance.

(5) The lug 60 is resiliently movable about a fulcrum positioned on the wall of the slit 61. Therefore, when the engaging portion 40 is slid into the guide 30 and when the lug 60 mates with the recess 50, the lug 60 resiliently snaps into the recess 50. This allows the clip 20 to be extremely easily mounted to the body 10.

(6) The lug 60 is formed integrally with the body 10 with the slit 61 surrounding the lug 60. The clip 20 can therefore be mounted to and dismounted from the body 10 without resorting to a sophisticated structure or a number of parts. This reduces the production cost of the holder.

Figure 7:
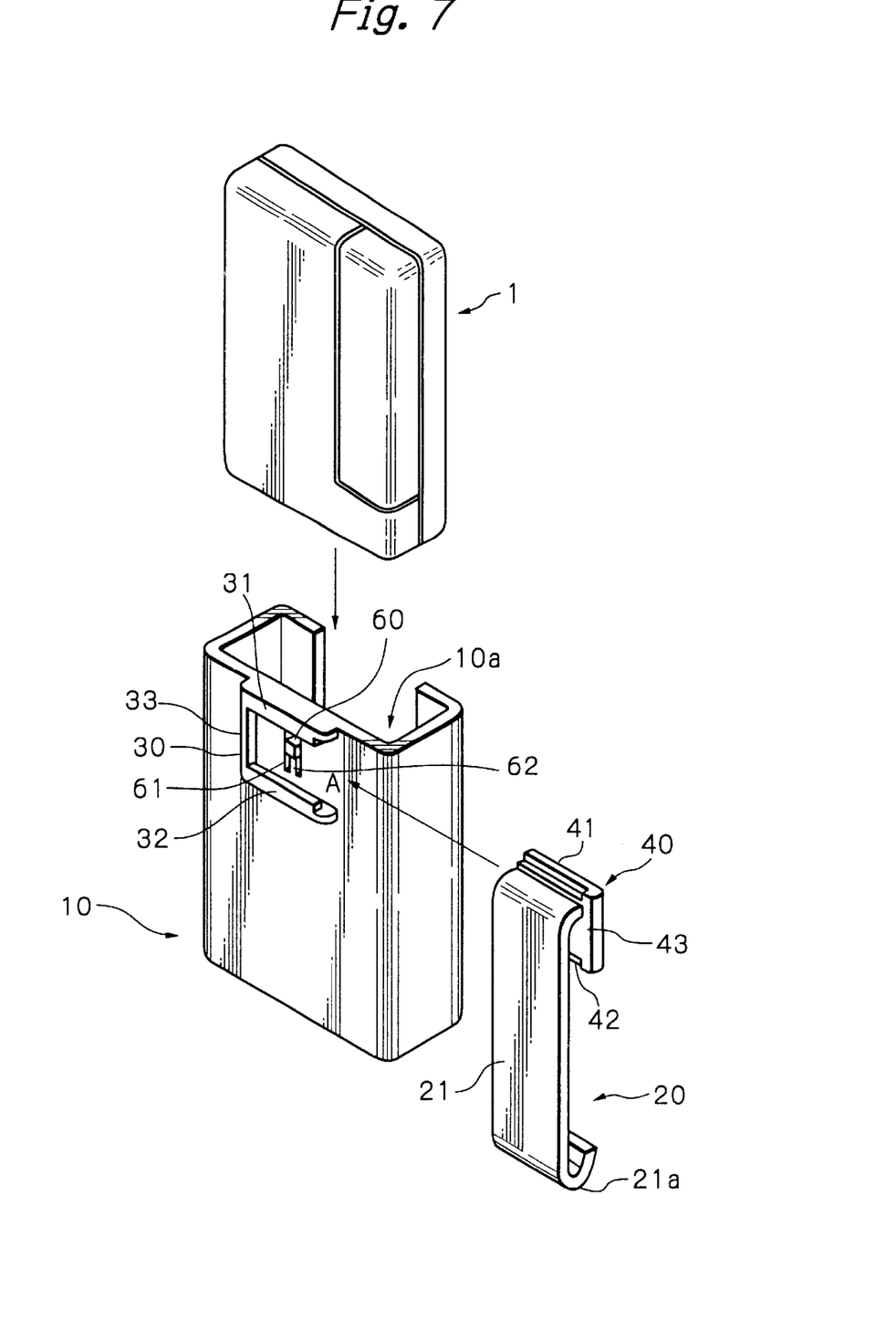
FIG. 7 is an exploded perspective rear view showing an alternative embodiment of the present invention.
Figure 8:
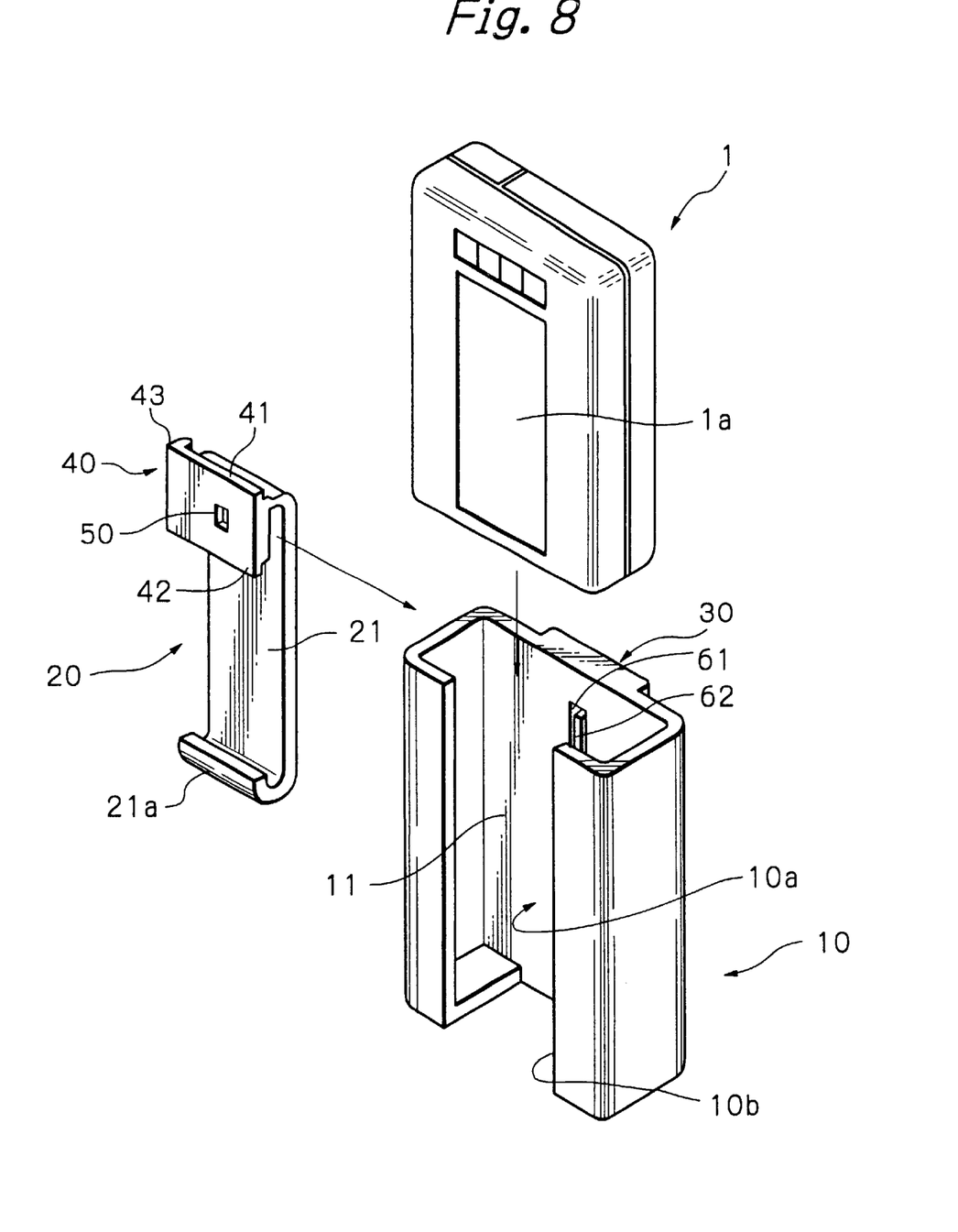
FIG. 8 is an exploded perspective front view of the alternative embodiment.
Figure 9:
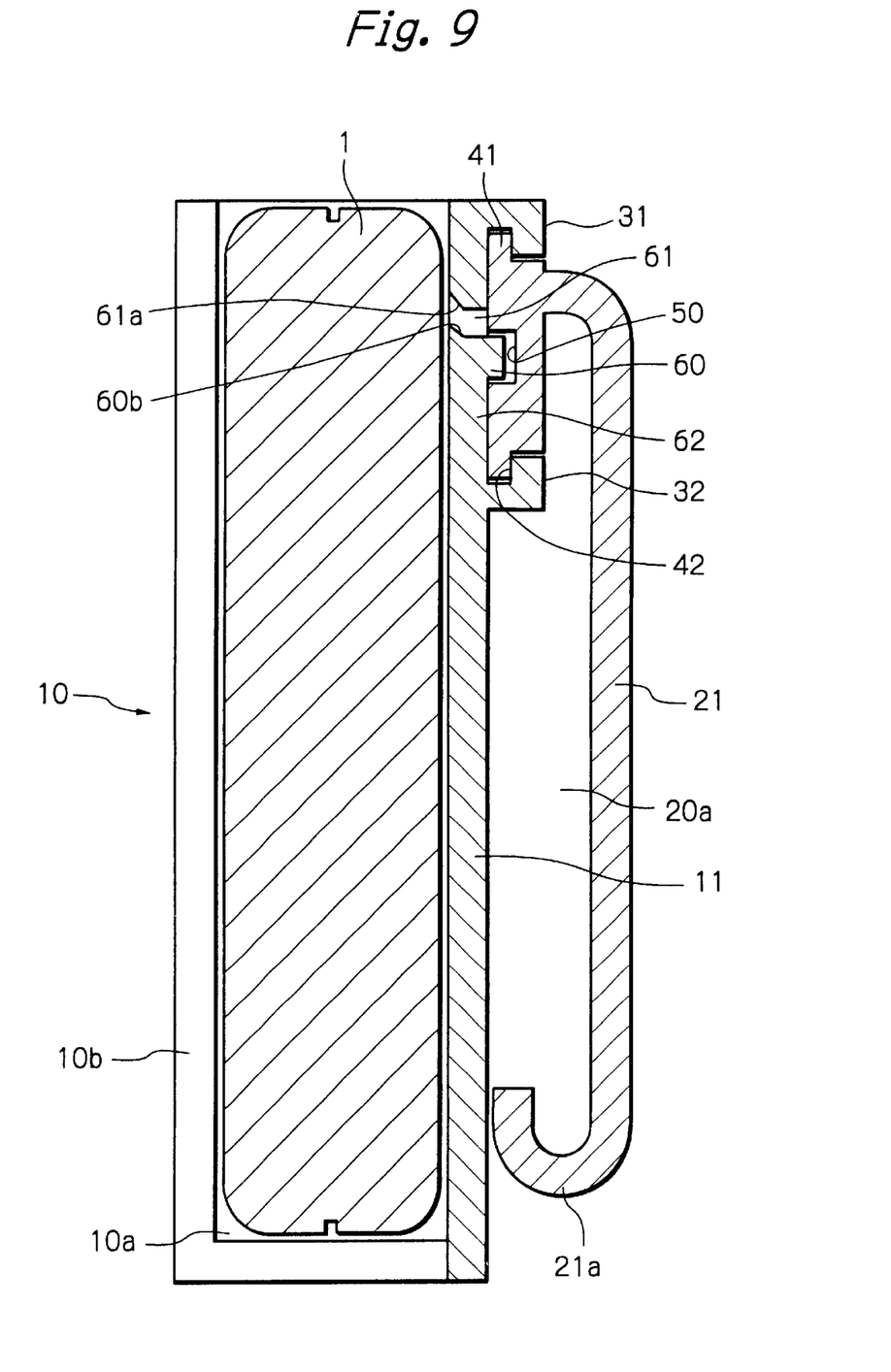
FIG. 9 is a vertical sectional side elevation showing the alternative embodiment with a portable apparatus.

Referring to FIGS. 7, 8 and 9, an alternative embodiment of the holder in accordance with the present invention will be described.

As shown, this embodiment is identical with the previous embodiment except for the orientation of the slit 61. In FIGS. 7–9, the structural elements identical with the structural elements shown in FIGS. 3–6 are designated by identical reference numerals and will not be described specifically in order to avoid redundancy.

As shown in FIGS. 7–9, the slit 61 surrounding the lug 60 except for the resilient piece 62 is elongate in the direction substantially perpendicular to the direction in which the engaging portion 40 is slid into the guide 30 (direction A, FIG. 7). The lug 60 is connected to one end of the slit 61 in the above direction by the elastic piece 62. It follows that the lug 60 expected to mate with the recess 50 is also positioned substantially perpendicularly to the lug 60 of the previous embodiment. In addition, as shown in FIG. 9, the inclined portion 60*b* of the lug 60 and the inclined portion 61*a* of the slit 61 both are inclined in the direction of height of the body 10.

The above orientation of the slit 61 allows a position where the lug 60 is more easy to remove from the recess 50 to be selected and thereby makes the clip 20 easier to replace.

The inclined surfaces 60*b* and 61*a* of the lug 60 and slit 61, respectively, each are inclined upward in the direction of height of the body 10, as stated above. This allows the user to release the lug 60 from the recess 50 via the front opening 10 *b* or the top opening of the body 10, as desired. The clip 20 is therefore easier to remove from the body 10 than the clip 20 of the previous embodiment.

In summary, it will be seen that the present invention provides a holder needing a minimum number of parts, allowing a body and a clip to be firmly assembled in a simple structure, and promoting easy and rapid replacement of the holder or that of the clip.

Various modifications will become possible for those skilled in the art after receiving the teachings of the present disclosure without departing from the scope thereof. For example, in the illustrative embodiments, the body of the holder is implemented by a thin plate in the form of a bottomed rectangular case open at its front and bottom. However, the present invention is applicable to any kind of body capable of accommodating a portable apparatus and being provided with a guide and an engaging portion at one side thereof.

Figure 10:
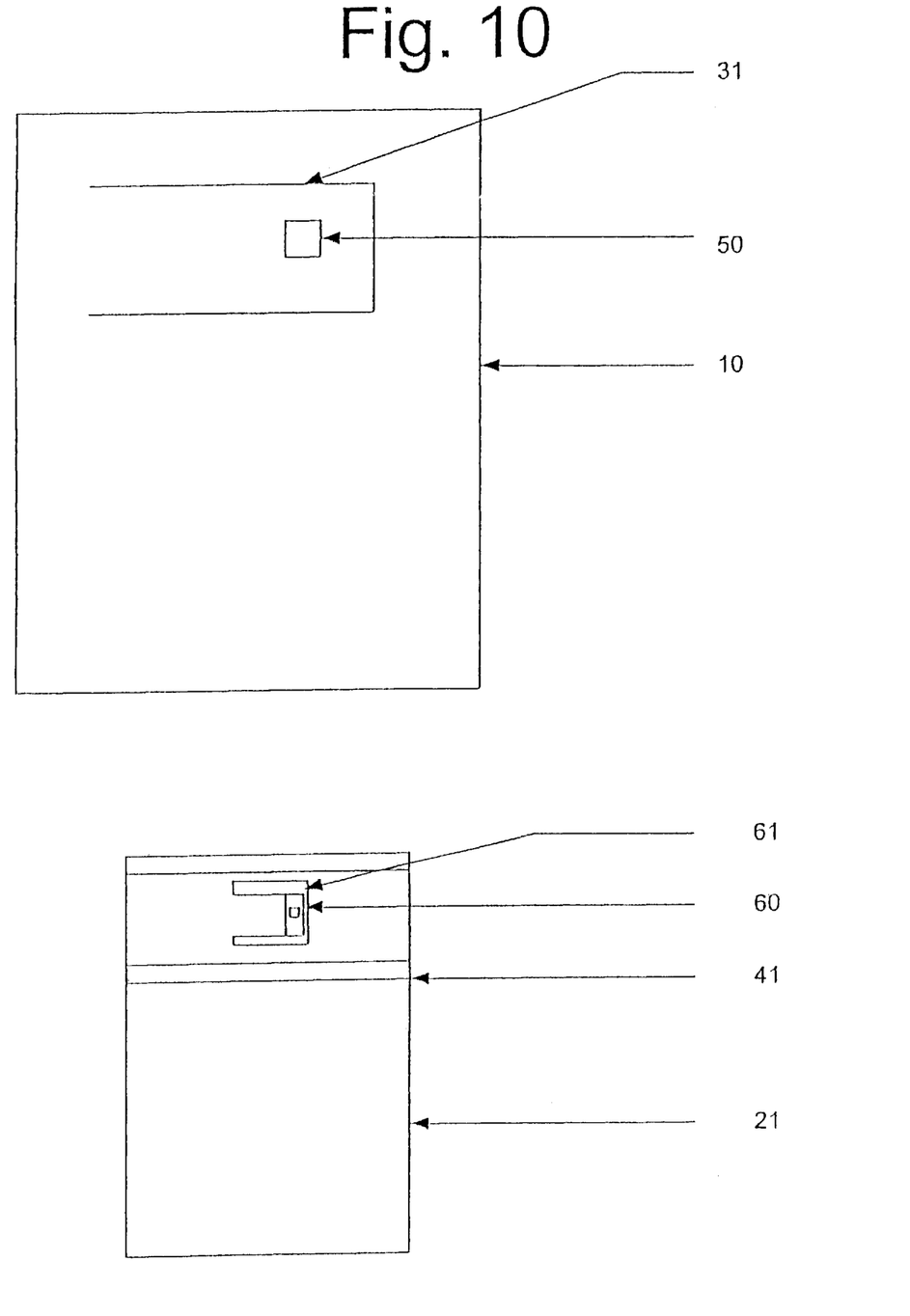
FIG. 10 is a rear view showing an alternative embodiment of the present invention.

To lock the clip to the body, the illustrative embodiments each include a lug and a recess provided on the body clip, respectively. Alternatively, as shown in FIG. 10, the lug 60 and recess 50 may be provided in the clip 21 and body 10, respectively. The lug is preferably positioned between one of the rails 31 and ridges 41 formed on the body and clip, the slit 61 surrounding the lug is preferably formed throughout the wall of the engaging portion, and the clip is removed from the body from the outside of the clip.

Two or more guides capable of mating with the engaging portion may be formed on the body so as to allow the user to change the position for mounting the clip to the body, as desired.

Also, two engaging portions may be formed on both ends of the clip, in which case two guides respectively capable of mating with the engaging portions will be formed on the body. This allows the clip to be more firmly mounted to the body.

What is claimed is:

1. A holder for a portable apparatus, comprising:

a body for removably receiving the portable apparatus;

a clip removably mounted said body, said clip having an upper bent end which is elastically deformable for biasing the clip relative to the body;

a guide rail formed on one surface of said body and including a pair of parallel rail;

an engaging portion included in said clip and including a pair of ridges slidingly engageable with said pair of rails;

a locking device provided on said guide and said engaging portion for selectively locking or unlocking said guide and said engaging portion to or from each other, said locking device comprising a recess positioned between said pair of rails and a lug positioned between said pair of ridges; and a slit surrounding said lug, said lug being connected to one side of a wall of said slit and elastically deformable toward and away from said recess;

wherein said recess and said lug mate with each other when said engaging portion is slid into said guide.

2. A holder as claimed in claim 1, wherein a surface of said lug facing said engaging portion when said engaging portion is slid into said guide is inclined forward in a direction in which said engaging portion is slid into said guide.

3. A holder as claimed in claim 2, wherein an end of said lug opposite to an end connected to said wall of said slit is inclined toward said recess.

4. A holder as claimed in claim 3, wherein a portion of said wall of said slit facing the inclined end of said lug is inclined substantially in parallel to said inclined end.

5. A holder as claimed in claim 4, where in said slit is elongate in said direction.

6. A holder as claimed in claim 4, where in said slit is elongate in a direction substantially perpendicular to said direction.

7. A holder as claimed in claim 1, wherein an end of said lug opposite to an end connected to said wall of said slit is inclined toward said recess.

8. A holder as claimed in claim 1, wherein a portion of said wall of said slit facing the inclined end of said lug is inclined substantially in parallel to said inclined end.

9. A holder as claimed in claim 1, wherein said slit is elongate in said direction.

10. A holder as claimed in claim 1, wherein said slit is elongate in a direction substantially perpendicular to said direction.

* * * * *